United States Patent [19]

Lindholm

[11] Patent Number: 5,461,614
[45] Date of Patent: Oct. 24, 1995

[54] METHOD AND A DEVICE FOR RESEQUENCING

[75] Inventor: Lars Å. a. Lindholm, Tullinge, Sweden

[73] Assignee: Telefonaktiebolaget LM Ericsson, Stockholm, Sweden

[21] Appl. No.: 260,926

[22] Filed: Jun. 15, 1994

[30] Foreign Application Priority Data

Jun. 15, 1993 [SE] Sweden .................................. 9302060

[51] Int. Cl.⁶ ..................................................... H04L 12/56
[52] U.S. Cl. .............................................. 370/60; 370/94.1
[58] Field of Search .............................. 370/13, 54, 58.1, 370/58.2, 58.3, 60, 60.1, 61, 94.1

[56] References Cited

U.S. PATENT DOCUMENTS

| | | | |
|---|---|---|---|
| 4,630,260 | 12/1986 | Toy et al. | 370/60 |
| 4,703,475 | 10/1987 | Dretzke et al. | 370/60 |
| 4,807,224 | 2/1989 | Naron et al. | 370/94.1 |
| 5,008,878 | 4/1991 | Ahmadi et al. | 370/60 |
| 5,127,000 | 6/1992 | Henrion | 370/60 |
| 5,128,929 | 7/1992 | Kobayashi | 370/58.1 |
| 5,173,897 | 12/1992 | Schrodi et al. | 370/60 |
| 5,222,061 | 6/1993 | Doshi et al. | 370/13 |
| 5,253,251 | 10/1993 | Aramaki | 370/60 |
| 5,337,313 | 8/1994 | Buchholz et al. | 370/94.1 |

*Primary Examiner*—Alpus Hsu
*Attorney, Agent, or Firm*—Burns, Doane, Swecker & Mathis

[57] ABSTRACT

In a data packet network, packets are transferred from input ports to output ports. Packet transfers can require time periods of different lengths because data packets, as they are transported in the network, pass through units where they are subjected to processing. In each input port, a list is established of current combinations of source addresses and destination addresses for the data packets that have arrived at the input port. The list includes the current sequential number for data packets having this combination. This list is restricted or limited so that it includes only a small number of records. When a data packet is received by an input port, and the source address and destination address of the data packet are not already in the list, the record in the list that has been inactive for the longest time period is overwritten, thereby erasing the corresponding sequential number. When a message having the same source address and destination address arrives again, the sequential number is restarted. At the same time, a flag is set in the packet, indicating the restart. Further, those records that have been inactive during some predetermined time period are removed from the list. Also, in the output port there is a similar list that is reduced to avoid long search times. If a record in the list in an output port has been inactive for a sufficiently long time, it can be removed from the list, since then the corresponding record is already removed in the list in the input port.

28 Claims, 7 Drawing Sheets

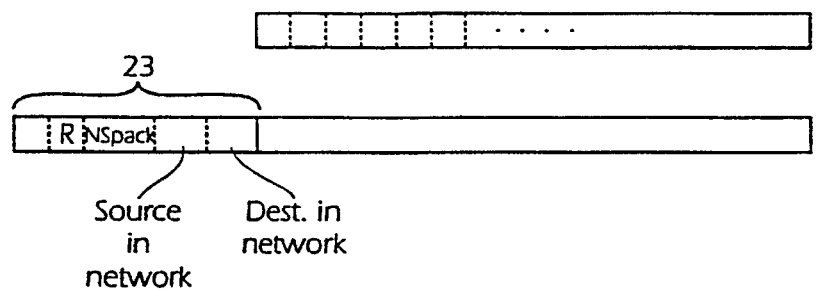
Fig. 2a
Fig. 2b
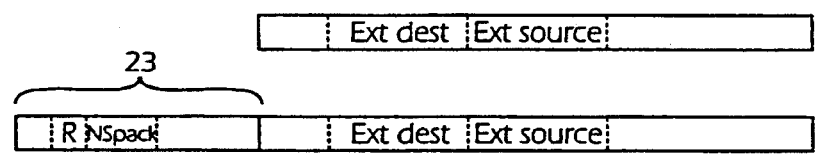
Fig. 3a
Fig. 3b
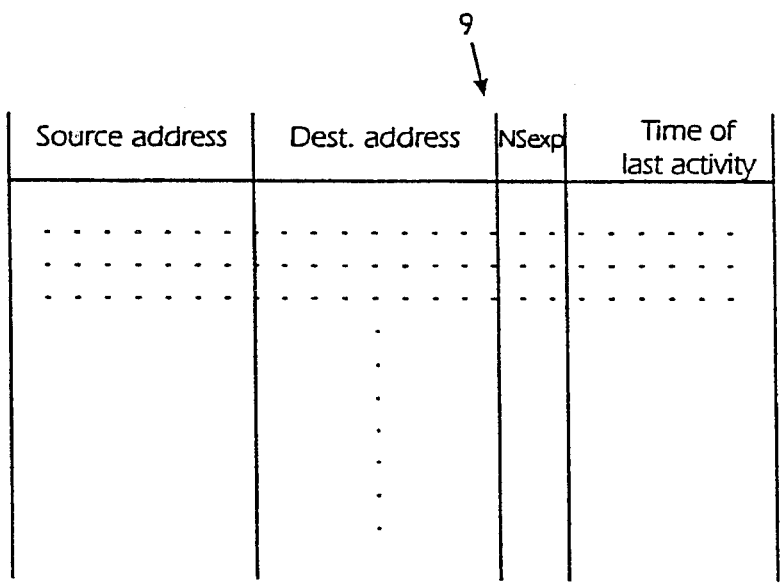
Fig. 4
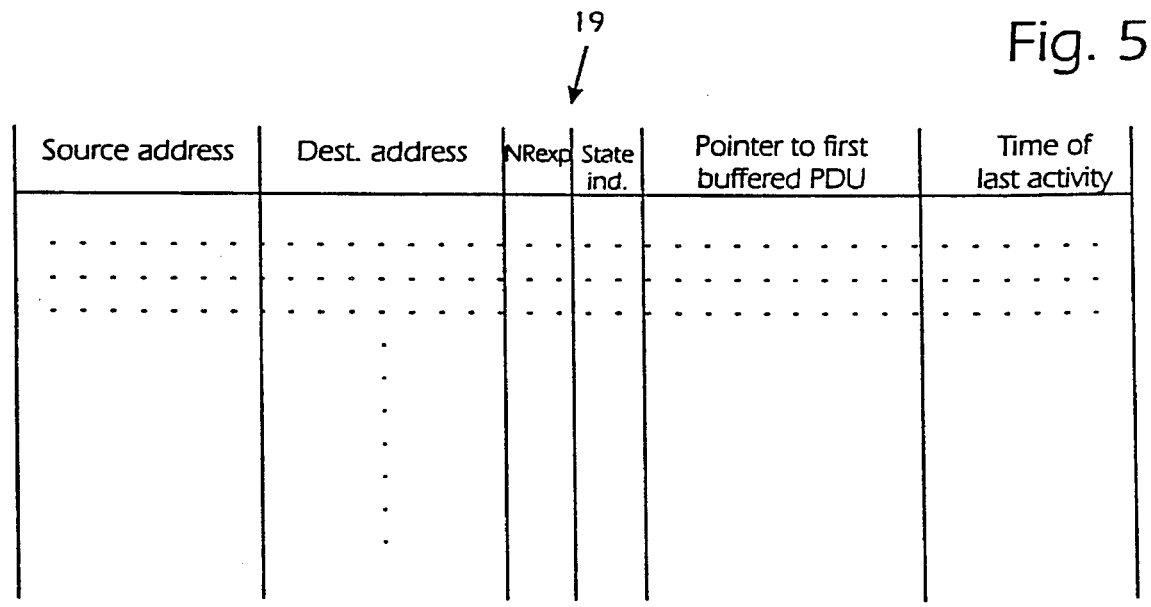
Fig. 5

METHOD AND A DEVICE FOR RESEQUENCING

BACKGROUND

The invention relates to a method and a device for the resequencing of data messages or data packets which are transferred from an input port to an output port in a network.

In processing operations of data messages which are being transferred in a network it may for the processing be necessary or very advantageous to distribute an incoming stream of data messages over several different parallel processing units such as servers. A processing unit may in certain cases for instance not have time to process all the data messages transferred. Then, of course a more rapid processing unit can be used, when it is possible or not too costly, but as alternative several parallel units can be used. In order to utilize several processing units in a way which is as efficient as possible a dynamic distribution of the data packets is required over the available processing units. It can mean that for instance the unit which at a considered instant has the lowest load will obtain the next message which will arrive to the network in order to be processed. Another possibility is to randomly distribute the incoming messages over the available processing units. A great advantage of this dynamic distribution is further achieved if the load from a multitude of input ports is dynamically distributed on several processing units. Then a statistic profit will arise resulting in that the total server capacity can be substantially reduced compared to the case where each input port is associated with a selected, predetermined processing unit.

However, the stream of data messages most often consists of messages from different sources which are to be delivered to their destinations in the same sequential order as the messages arrived. In a dynamic distribution it cannot be safe-guarded that the correct sequential order is maintained since it is not at all sure that the processing units work equally fast. In order to be able to still perform this dynamic load distribution the correct sequential order of the individual data messages must in some way be restored, at least before the delivery and transmission from the network. The conventional method of solving this problem is that each message is marked with a sequential number when the message is received at an input port of the network and that a resequencing is performed in the delivery from the network by means of the sequential numbers of the forwarded data packets, these sequential numbers before the forwarding being removed from the data messages.

The requirement of a correct sequential order is in this case valid only for pairs of a source and a destination. Sources and destinations are conventionally identified with unique addresses in the network and in the data messages. At the input port of the network each incoming message must be assigned a sequential number or order number which indicates the sequential position of the message in relation to previously arrived messages from the same source, in order that it will be possible to restore the sequential order of the data messages at the output port. This assigned sequential number must therefore in the input port be taken from a memory and from a list stored therein which is established by the logic circuits in the input port and contains the current, next following sequential number for each possible combination of sources and destinations, or at least so many such pairs of sources and combinations, which up to the reception of this data packet have been encountered in data packets arrived to the input port. A very long list of such combinations of sources and destinations together with the current sequential numbers must then in many cases be stored and administered and at the arrival of a new data packet half the list must be searched, in an average, in order to find the same combination of source and destination which is valid for the received data packet. Such a list will then easily comprise hundreds or thousands of records among which a searching operation would require a time period having an unacceptable length.

The patent U.S. Pat. No. 5,127,000 describes a packet distributing network with automatic resequencing. If the packets follow different paths through the network, they may be subjected to different delays and thereby the packets can arrive to the output port in a wrong sequential order. The patent discloses a method of restoring the sequential order of the packets at the output port. According to the document a circuit is provided providing the packet with a "time stamp" at the input port of the network. Before the output the time delay is detected which the network has caused to the packet. The packet is delayed even more so that the total delay will be equal to a predetermined value. Thereby the total delay through the network will be approximately constant and the packets are delivered to the output port in the same sequential order as they were delivered to the input port.

The patent U.S. Pat. No. 4,807,224 is related to a system for distributing data in the shape of packets to a large number of receivers. A central unit sequentially issues packets which among other things contain an information field and a sequential number, to a number of receivers and back-up units. Each receiver copies the data packets to a buffer in order to be able to select portions which are of interest to the receiver. If the receiver discovers that a packet is missing it can be taken from a back-up unit. A packet is considered missing if a predetermined time period has elapsed since the previous packet was received or if a packet having a wrong sequential number arrives. The receiver can thus restore the sequential order when transmission errors occur.

The patent U.S. Pat. No. 4,630,260 relates to a method for coupling packets through a packet distributing network with a maintained sequential order at the output side of the network. The sequential order is maintained simply by the method that packets having the same address cannot be transmitted in parallel over the same node.

The patent U.S. Pat. No. 5,173,897 is concerned with an ATM-network where the successive cells of a logical connection are routed to the output by as many different paths as possible. At the input end the consecutive sequence numbers are allocated to the cells. At the output end each cell is held until it is certain that no older cell can be buffered in the switching area of the network.

SUMMARY

The purpose of the invention is to provide methods for transferring data packets in a network in an efficient way when the transfer of data packets may require transfer time periods of varying lengths and also to provide a network for performing the methods.

Another purpose is to provide methods and a network for transferring data packets from inputs to outputs where there is a limited need of memory space for administrative lists in the inputs and outputs.

These purposes are achieved by the invention and the problem mentioned above is solved by means of the method and the device according to the invention.

In a data packet network packets are transferred from input units or input ports to output units or output ports and the transfer of packets from an input port to an output port can require time periods having different lengths, for instance due to the fact that the data packets in their transport through the network pass through different units where they are subject to processing. In each input port of the network data packets arrived from the exterior are assigned a sequential number and a list is there established of current combinations or pairs of sources and destinations for the data packets which have arrived to the input port. The list also comprises the current or next sequential number of the data packets having each such combination or such pair. The sequential numbers are inserted in the data packet in order to allow a check and a restoration of the correct sequential order of the packets. The list can be limited or restricted so that it for instance will only comprise a small number of records, for instance 16 records. When a data packet arrives to the input port having a combination of a destination address and a source address which is not already stored in the list and the list is full, that record in the list can be overwritten which has been inactive during the longest time period and the corresponding next sequential number stored in the record will then be erased. Further, a flag is set in the packet indicating that this packet is the first one in the sequential order. When then a message having the same combination of a source address and a destination address as in the record which was overwritten will arrive again, the sequential numbering is restarted for the combination of a destination address and a source address which was present in the cancelled record and in the data packet now processed, simultaneously as a flag, similar to the flag already mentioned, is set in the packet which indicates the restart or generally expressed that this packet is the first one in the sequential numbering which is currently valid. The list is limited or restrained by the method that continuously or all the time those records are removed from the list which have been inactive during a certain predetermined time period. Also, at each output port a similar list is arranged and it must also be maintained as short as possible in order to avoid long searching times. If a record in the list at an output port has been inactive during a sufficiently long time period, then this record can be removed from the list since the corresponding record will then already be removed from the list in the corresponding input port.

Generally the following is true: In a network part or here shortly only called a network, data messages or data packets arrive to input/output ports and are forwarded from the network part or the network on input/output ports. In the travel through the network a data packet can follow different paths, for instance by the fact that it will pass through different parallel processing units or servers. At the arrival at an input/output port a sequence or sequential number is inserted in or added to the data packet, which sequential number indicates the sequential position of the data packet among all those data packets which have arrived to the input/output port from the outside and have the same combination of source addresses and destination addresses as the considered data packet. In the input/output port a list is established comprising such combinations of source addresses and destination addresses of all data packets which have been received up to now. In order to reduce the search time for this list two measures can be performed. First, the list can be limited to a little number of combinations of source addresses and destination addresses, for instance typically 16 such combinations, and these combinations will then at each instant represent the latest combinations of source addresses and destinations, which have appeared in the processing of those data packets which have arrived latest. Second, those combinations of source addresses and destination addresses can be removed from the list all the time, which combinations have been inactive during a sufficiently long time period. It means that for these records a time period has elapsed after any data packet arrived to the input/output port having the combination of a source address and a destination address as indicated in the record, and that this time period exceeds a predetermined time value. Each time a new combination of a source address and a destination address is present in a data packet arrived to an input/output port, which combination thus is not present in the stored list, a flag is set indicating this situation in the data packet. This flag can be removed after the transfer of the data packet through the network. In addition, in the data packet a sequential number is inserted having a value corresponding to a suitable start value, for instance 1.

The selected time period length or the predetermined time value $T_{il}$, which has to be exceeded for the case that a record in the list comprising a certain combination of a source address and a destination address is to be removed from the list, is determined in such a way that there will always arise a "sufficient time period". The time period shall safe-guard that the network has had time to be emptied, i.e. that a message having a certain combination of a source address and a destination address and which is the first message in a restarted sequence with this combination, i.e. when there is not already a record in the list having exactly this combination of a source address and a destination address, never can pass or arrive before data packets which have the same combination of a source address and a destination address but for which the record in the list has already been erased, before the first considered message arrived, i.e. messages which have the same destination addresses and source addresses and which belong to an earlier sequence. If for instance the list is allowed to comprise 16 records at most, always at least the time period will arise, which corresponds to the time period which is needed for transmitting 16 messages before a sequentially restarted data packet is transmitted, i.e. such a data packet, the combination of a source address and a destination address of which was not previously in the list but was entered therein. If it is further presupposed that the input logic can transmit messages into the network with a minimum time interval $T_i$, if the input list generally contains n records, the condition $n \cdot T_i \geq T_{il}$ is thus obtained, i.e. that the number of records n in the list must be larger than or equal to $T_{il}/T_i$. The list will thus be able to maintain a limited length without causing any queue phenomena or similar.

If it is assumed, that the absolute maximum variation of the time period during which a message is transported through the network, is $T_{max\_v}$, for instance equal to 5 ms, for the time period $T_{il}$ which is required to eliminate the earlier mentioned risk that a sequentially restarted data packet will be able to pass an earlier transmitted data packet having the same combination of a source address and a destination address, it will be true that this time period Til must be larger than or equal to $T_{max\_v}$, i.e. $T_{il} \geq T_{max\_v}$. The logic for handling incoming messages in an input/output port is thus not allowed to transmit a message with such a restarted sequential number with a shorter time interval than $T_{max\_v}$ after the preceding data packet which has the same combination of a source address and a destination address.

The logic circuits which in an output port handle the forwarding from the network of messages transferred in the network can however not be designed in such a way that they can comprise a list which has an equally limited number of records of source addresses and destination addresses. Some limitation of the list at the output side can be made, however. In the same way as at the input side of the network, here records containing combinations of source addresses and destination addresses can be removed which have been inactive during sufficiently long time periods. Inactivity here means that no data message has arrived to the input/output port in order to be forwarded from the network during a sufficiently long time period. If such a record has been inactive during a time period of $T_{il}+T_{max\_v}$ up to the current instant, the sequential number of this combination of a source address and a destination address will be restarted by the logic in the input/output port which handles messages incoming from the outside to the network. In this case the logic circuits at the output side can remove the corresponding record from the memory thereof.

Thus, assume that the logic circuits at the input side in an input/output port forward, just before the time that a record has become inactive in its list, i.e. just before the time period $T_{il}$ elapses, a message and that this message passes as slowly as possible through the network (delay $T_{max\_v}/2$ compared to the average of transferred data packets), while the preceding data packet having the same combination of a source address and a destination address passed as quickly as possible through the network (arrives at a time which is $T_{max\_v}/2$ earlier than the time for a packet which is transferred as the average). The time difference of the reception times of these messages by the logic circuits at the output side in an input/output port will then be a little below $T_{il}+T_{max\_v}$. A record at the output side may thus not be erased earlier than the time when the time period $T_{ol}$ has elapsed from the last activity for the record, where $T_{ol} \geq T_{il}+T_{max\_v}$.

Due to the fact that time periods having various lengths are required for transferring the data packets from an input port to an output port a buffer memory is needed in each output port in order that it will be possible to perform a resequencing of the data packets. A packet stored in the buffer memory may however not rest there a too long time period before forwarding if a time length $T_b$ has elapsed since it arrived to the output port. This time length $T_b$ is to be selected such that the condition $T_{max\_v} \leq T_b \leq T_{il}$ is satisfied. If it is not forwarded from the network, a possibly sequentially restarted packet may arrive to the output port before the buffered packet has had time to be forwarded and then the buffer packet is erased.

If further an output port can receive data packets transferred over the network with a minimum time interval of $T_o$, in the same way as above it is true that the number m of records which must be present in the list at the output without causing any queuing problems, must be larger than or equal to $T_{ol}/T_o$, i.e. $m \geq T_{ol}/T_o$. The list in the output port will thus also be limited in length.

Thus a method is provided for transferring data packets between input ports and output ports in a network in which the transfer of a data packet from an input port to an output port can require time periods of varying lengths and each data packet may be associated with a source address and/or a destination address. These addresses can be addresses used only inside the network, then indicating the various inputs and outputs of the network. They can also be original and final addresses for the data packet usually being written in a particular field of the data packet. The method comprises:

1. At the arrival to an input port a sequential number is inserted in or added to the data packet, the sequential number indicating the sequential position of the data packet. In the first case then also the output port is determined, to which the data packet is to be transferred, and the address of the input port is inserted in or added to the data packet. The sequential number indicates then the sequential position of the data packet among data packets which have arrived or will arrive to this input port and for which the same output port is determined. In the second case the sequential number indicates the sequential position of the data packet among packets which have arrived to this input port and have the same combination of a source address and a destination address as the arrived data packet, 2. At an output port the sequential numbers of the transferred data packets are used for forwarding the data packets in a correct sequential order. In the first case then the data packets are forwarded in a correct sequential order only in regard of each address of an input port which is found in the forwarded data packets. In the second case this means that the data packets are forwarded in a correct sequential order only in regard of each combination of a source address and a destination address of the forwarded data packets.

3. In an input port and/or an output port a list is established comprising records, each record comprising one of the different addresses associated with the data packets and also a current sequential number which is to be inserted in or added to the next data packet having the same address, if and when such a packet will arrive. In the first case each record in a list in an input port comprises one of the addresses of different output ports, to which it has been determined that data packets arrived to the input port are to be transferred. The current sequential number in the record will in this case be inserted in or added to the next data packet for which it will be determined that it is to be transferred to the output port indicated in the same record, if and when such a packet arrives to the input port. In this case also, in an output port a list may comprise records which each one comprises a different one of the addresses of input ports which have been taken from data packets transferred to the output port. The current sequential number in the record is here the sequential number which is to be found in the next data packet which has the same address of an input port as the address stored in this record and which packet is to be forwarded from the output port. In the second case each one of the records in a list in an input port then comprises a different one of the combinations of source addresses and destination addresses of data packets arrived to the input port and the current sequential number in the record will then be inserted in or added to the next data packet having the same combination of a source address and a destination address, if and when such a packet arrives to the input port. Further, in this case a list in an output port may comprise records, where each record comprises the different combinations of source addresses and destination addresses of data packets transferred to the output port. The current sequential number is the sequential to be found in the next data packet which has the same combination of a source address and a destination address that is indicated in this record and which is to be forwarded from the output port.

4. Each one of these lists may be and generally at least one of these lists is limited or restricted so that it is as short as possible and still allows a resequencing and then it contains different addresses associated only with the latest received data packets, this being achieved in two ways:

by restricting or limiting the list to a predetermined little number of addresses, that is a little or small number of records, for instance by arranging only a small memory for the list, and/or by removing from the list an address with an associated current sequential number, when, during a predetermined time period, no data packet has been received having this address.

When each data packet is associated with a source address and a destination address the method as applied in this case may mean that a list in an input port is restricted to a predetermined number of records comprising combinations of source addresses and destination addresses, which at each instant represent those combinations of source addresses and destination addresses which have appeared in the data packets arrived latest to the input port.

In this case it is advantageously arranged so that the number of records in the list in an input port comprising combinations of source addresses and destination addresses corresponds to only a small number of the combinations of source addresses and destination addresses which are possible for the arrived data packets.

Further, then from a list in an input port a record can be removed comprising a combination of a source address and a destination address and a current sequential number, when, during a predetermined time period, no data packet has arrived to the input port associated with the combination of a source address and a destination address indicated in this record.

For achieving it, in a list in an input port of the network, also in each record comprising a combination of a source address and a destination address information can be inserted in regard of the time when a data packet latest arrived to the input port associated with the combination of a source address and a destination address indicated in this record. This time indication may then be used for monitoring and removing too old records, in which nothing has happened during a recent time period.

Further in this case, from a list in an output port a record can be removed comprising a combination of a source address and a destination address and a current sequential number, when, during a predetermined time period, no data packet has been transferred to the output port associated with the combination of a source address and a destination address indicated in this record.

In the general case when the input ports and the output ports have addresses in the network, the method may mean that a list in an input port is restricted to a predetermined number or a little number of records comprising addresses, which at each instant represent the addresses of the output ports which have been determined for the data packets arrived latest to the input port.

Also in this case the numbers of records in the list comprising addresses of output ports can be restricted, for instance physically by arranging only a small memory therefor, to correspond only to a predetermined little number of the output ports possible for the arrived data packets.

Further in this case, from the list in an input port of the network a record can be advantageously removed comprising an address of an output port and a current sequential number, when, during a predetermined time period, no data packet has arrived to the input port for which it was determined that it was to be transferred to the output port indicated in this record.

In this case, like the other general case, in each record in the list in an input port comprising addresses of output ports advantageously information is inserted relating to the time when a data packet latest arrived to the input port which was to be transferred to the output port indicated in this record. This makes it possible to delete from the list records for which there has been no activity during a predetermined time period.

Further, in this case, from a list in an output port a record can be removed comprising an address of an input port with an associated current sequential number, when during a predetermined time period no data packet has been transferred to the output port comprising the address of the input port indicated in this record.

Further, in the other general case with original addresses and final destinations in the packets, in the transfer of a data packet to an output port, which data packet has a sequential number following the current sequential number, which is found in a list in the output port of the combinations of source addresses and destination addresses, that is valid for the data packet, the data packet can be stored to be forwarded later from the output port. The corresponding procedure may be performed also in the case where a list in an output port comprises addresses of input ports, allowing a storing of a data packet with a sequential number after the current one.

At the same time as when a data packet is stored having a sequential number following the current sequential number, information can be stored relating to the time when the data packet was received in the output port. When a data packet then has been stored in an output port during at least a predetermined time period, the data packet can then be forwarded from the output port. When thus a data packet stored in an output port is forwarded from the output port, advantageously the current sequential number which is found in the record in the list, which comprises the combination of a source address and a destination address of this data packet, is set equal to the sequential number which follows directly after the sequential number of the forwarded data packet.

Thus, also a network is provided for the transfer of data packets between input ports and output ports of the network, in which the transfer of a data packet from an input port to an output port can require time periods of different lengths and each data packet can be associated with a source address and/or a destination address. This network comprises means for, at the arrival of a data packet to an input port, inserting in or adding to the data packet a sequential number indicating the sequential position of the data packet, means for using, in an output port, the sequential numbers of the transferred data packets in order to forward the data packets in a correct sequential order, means in an input port and/or an output port for establishing a list comprising different addresses associated with the data packets and a current sequential number which is associated with the next data packet having the same address, the means for establishing a list being arranged to restrict the list in such a way that it is as short as possible and only contains addresses associated with those data packets which have been latest received, by the method that memory means which belong to the means for establishing a list and in which the list is stored, have a predetermined or limited size, so that only a little number of records comprising addresses and sequential numbers can be stored, and/or by the method that time monitoring means which are comprised in the means for establishing a list, are arranged to monitor each record in the list and to remove such a record from the list comprising an address with an associated current sequential number, when during a predetermined time period no data packet has been received having this address.

In the general case, wherein each data packet is associated with a source address and a destination address, advantageously the following is true for the network that the means for, at the arrival of a data packet to an input port, inserting in or adding to a data packet a sequential number are arranged to use a sequential number which indicates the sequential position of the data packet among data packets which have arrived to this input port and have the same combination of a source address and a destination address as the arrived data packet, that in the input port means are arranged for establishing a list comprising records which comprise the different combinations of source addresses and destination addresses of data packets arrived to the input port and, associated with each combination, a current sequential number which is to be inserted in or added to the next data packet having the combination of a source address and a destination address indicated in this record, if and when such a data packet arrives to the input port, that the means in the input port for establishing a list comprises memory means in which the list is stored, that the memory means have a limited size, whereby the list is restricted to a little number of records comprising combinations of source addresses and destination addresses, that the means for establishing a list in the input port comprises time monitoring means which are arranged to monitor the records of the list stored in the memory means and, when the memory means are full and at the appearance of a new combination of a source address and a destination address in a data packet arrived to the input port, which combination is not found in the list stored in the memory means, from the stored list to remove the record comprising a combination of a source address and a destination address being such that the longest time period has elapsed since any data packet having the combination comprised in this record arrived to the input port, whereby the list stored in the memory means at each instant comprises records comprising the different combinations of source addresses and destination addresses which have appeared in the latest arrived data packets, that the means for using, in an output port, the sequential numbers of the transferred data packets for forwarding the data packets in a correct sequential order are arranged to forward the transferred data packets in a correct sequential order only in regard of each combination of a source address and a destination address of the forwarded data packets.

Further, in this case, memory means may in particular be comprised in the means for establishing a list in the input port have such a size that the number of records in the list comprising combinations of source addresses and destination addresses correspond to only a little number of the combinations of source addresses and destination addresses which are possible for the arrived data packets.

Further, as stated above, in this case the time monitoring means comprised in the means for establishing a list in an input port may be arranged to also remove a record from the list comprising a combination of a source address and a destination address with an associated current sequential number, when during a predetermined time period no data packet has arrived to the input port having the combination of a source address and a destination address indicated in this record.

Further, in this case the means for establishing a list in an input port may be arranged, for each record in the list stored in the memory means comprising a combination of a source address and a destination address, also to insert information relating to the time when latest a data packet arrived to the input port having the combination of a source address and a destination address indicated in this record.

Further, in this case means may be arranged in an output port from the network to establish and in memory means associated with this means to store a list comprising records which comprise the different combinations of source addresses and destination addresses of data packets transferred to the output port, and associated with each combination a current sequential number which is to be found in the next data packet which has the same combination of a source address and a destination address that is indicated in this record and which is to be forwarded from the output port.

Further, time monitoring means may be comprised in the means for establishing a list in an output port and are arranged to monitor the records stored in the list and from the list remove a record comprising a combination of a source address and a destination address with an associated current sequential number, when during a predetermined time period no data packet has been transferred to the output port having the combination of a source address and a destination address indicated in this record.

In the other general case wherein the input ports and the output ports have addresses in the network, in the network preferably there are means in an input port of the network for determining, at the arrival of a data packet to the input port, the output port, to which the data packet is to be transferred, means for, at the arrival of a data packet, inserting in or adding to the data packet the address of this input port, means for, at the arrival of a data packet, inserting in or adding to the data packet a sequential number which indicates the sequential position of the data packet among data packets which have arrived to this input port and which have been transferred or are being transferred to the same output port as the arrived data packet, means in the input port comprising memory means to establish and to store in the memory means a list comprising records which comprise the addresses of the different output ports, to which data packets arrived to the input port have been transferred or are being transferred, and also in the list associated with such an address, a current sequential number that is to be inserted in or added to the next data packet which is to be transferred to this output port, if and when such a data packet arrives to the input port, the memory means having a limited size, so that the list stored therein is restricted to a little number of records comprising addresses, and/or time monitoring means comprised in the means for establishing a list and arranged to monitor the records stored in the list comprising addresses of output ports and current sequential numbers and, when the memory means are full and at the appearance of an address of a new output port valid for a data packet arrived to the input port, which address is not found in the stored list, to remove from the stored list the record comprising an address of an output port, which is such that the longest time period has elapsed since any data packet, for which an output port has been determined, which agrees with the address of an output port comprised in this record has arrived to the input port, whereby a list stored in the memory means at each instant comprises records which comprise addresses of the different output ports which have appeared in the data packets which have arrived latest to the input port, and further, the means in an output port for using the sequential numbers of the transferred data packets for forwarding the data packets in a correct sequential order are arranged to forward the data packets in a correct sequential order only in regard of each address of an input port which is found in or has been added to the forwarded data packets in an input port.

Further, in this case the memory means may, as discussed above, have such a size that therein can only be stored a number of records comprising addresses of output ports, which correspond only to a little number of the output ports which are possible for the arrived data packets.

Further the time monitoring means may be arranged to remove, from the list stored in the memory means in an input port of the network, a record comprising an address of an output port with an associated current sequential number, when during a predetermined time period no data packet has arrived to the input port, which is to be transferred to the output port indicated in this record.

The means for establishing a list in an input port of the network may also be arranged to, for each address of an output port, insert and store in the memory means information relating to the time when latest a data packet arrived to the input port which was to be transferred to this output port.

Further, means comprising memory means may be provided to establish, in an output port of the network, and to store in these memory means a list comprising records which comprise the different addresses of input ports which have been taken from data packets transferred to the output port, and associated with each address of an input port a current sequential number which is to be found in the next data packet which has the same address of an input port that is indicated in this record and which is to be forwarded from the output port.

Time monitoring means comprised in the means for establishing a list in an output port may further be provided and they are arranged to monitor the records comprised in the memory means in the output port comprising addresses of input ports and current sequential numbers and to remove from the list in an output port a record comprising an address of an input port and a current sequential number, when during a predetermined time period no data packet has been transferred to the output port containing the address of the input port indicated in this record.

In the general case of exterior source and destination addresses, further memory means may be comprised in the means in an output port for establishing a list and may be arranged, in the transfer of a data packet to this output port, which has a sequential number that follows the current sequential number, which is stored in the list in a record having the combination of a source address and a destination address which is associated with the data packet, to store the data packet in order to forward it later from the output port.

The further memory means are advantageously arranged, simultaneously as the storing of a data packet having a sequential number following the current sequential number, to store information relating to the time when the stored data packet was transferred to the output port.

Further time monitoring means can be comprised in the means for establishing a list in an output port and arranged to monitor the stored records in the further memory means and, when a data packet has been stored in an output port during at least a predetermined time period, to forward the stored data packet from the output port.

The means for establishing a list in an output port are advantageously arranged, when a data packet stored in the further memory means is forwarded from the output port, to set the current sequential number which is stored in a record in the list in the first memory means in the output port comprising the combination of a source address and a destination address of this forwarded data packet, equal to the sequential number which follows directly after the sequential number of the forwarded data packet.

In the other general case, where the input ports and the output ports have addresses in the network, preferably further memory means are provided in an output for storing data packets which have been transferred to the output and the sequential numbers of which do not agree with the valid current sequential number, generally follows after the current number.

DESCRIPTION OF THE DRAWINGS

The invention will now be described as a non-limiting embodiment with reference to the accompanying drawings, in which FIG. 4 shows the structure of a list which must be provided in an input port of the network, FIG. 5 illustrates the structure of a list which must be provided in an output port of the network.

DETAILED DESCRIPTION

Figure 1:
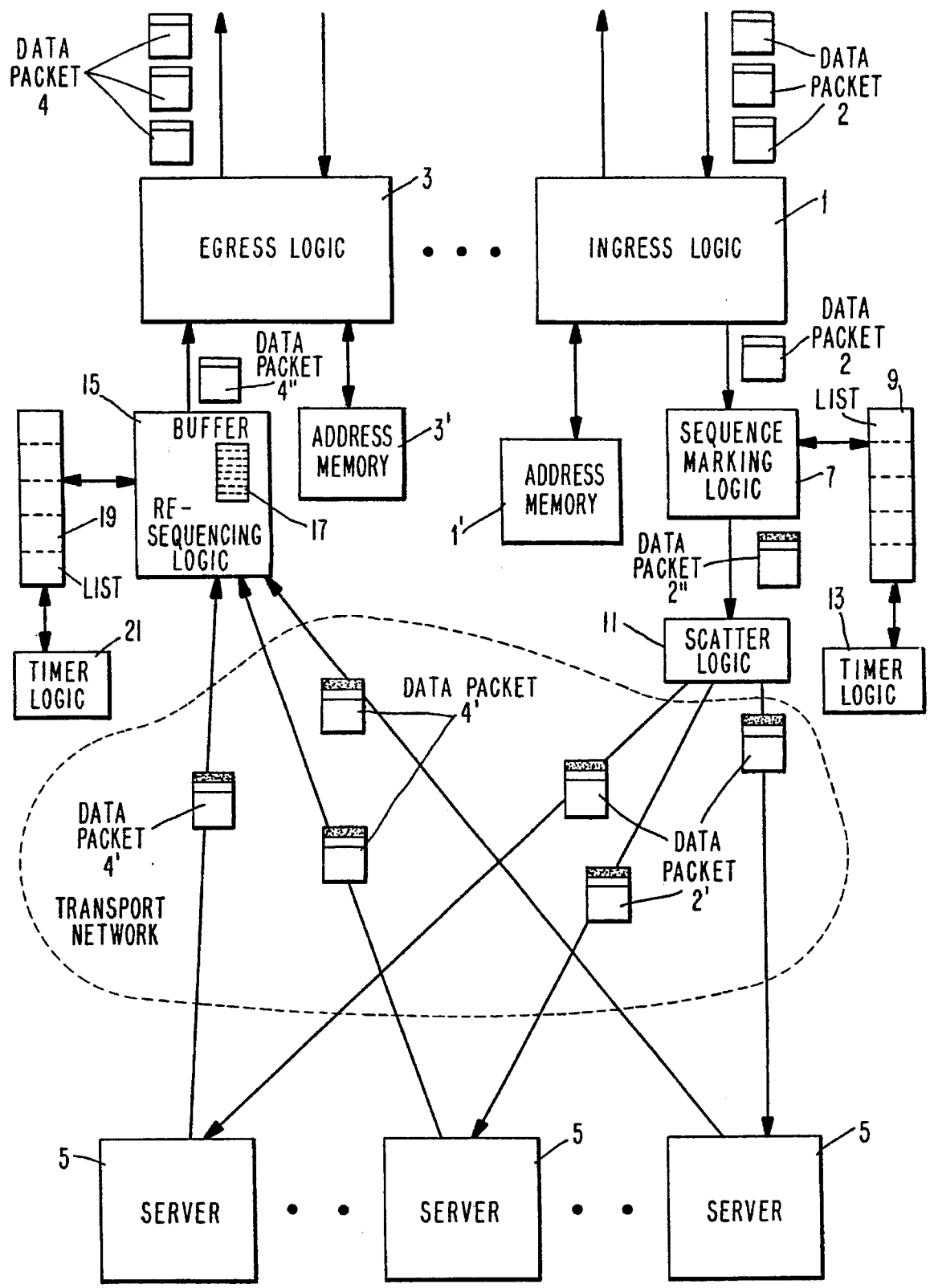
FIG. 1 shows a network having several servers and with input and output logic, FIGS. 2a, 2b schematically illustrate the formats of a data packet at the arrival to the network and at the transfer in the network respectively, FIGS. 3a, 3b schematically show alternative shapes of the formats.

In FIG. 1 a network is shown having an input/output port 1 and an input/output port 3. For simplicity only two ports of the network are illustrated while in practical use naturally more input and output ports most often are provided. For the first mentioned input/output port 1 that logic processing is schematically illustrated in a block shape which is performed when a data packet, shown at 2, arrives to an input/output port, while for the other input/output port 3 that logic processing is illustrated in a block shape which is performed for a data packet which has been transferred through the network and is to be forwarded therefrom on an input/output port, these forwarded packets being illustrated at 4. Naturally complete such logic units are arranged in all the input/output ports connected to the network and thus in particular in the illustrated input/output ports 1 and 3.

From each input/output port the incoming messages are transmitted further on in the network, as indicated by the packets 2', to several servers or processing units 5 which perform some processing of the data packets. From the servers 5 the data packets pass to the input/output port selected for the respective data packet as appears from an address in the data packet, these packets being indicated at 4'.

A first embodiment of the processing of a data packet in an input port and output port will now be described. In the input or ingress logic illustrated in the input/output port 1 for processing of an incoming data packet thus first the input/output port is determined to which the data packet is to be transferred after the processing thereof in a server 5. The ingress logic may therefor have access to a memory 1' comprising tables of address conversions. After that in a block 7 a sequential number "NSpack" is inserted in the data packet. This sequential number has been taken from a list 9 comprising records of output port addresses and an associated current or next sequential number "NSexp" and in particular from the record which comprises the output port address which by the ingress logic in the block 1 has been determined for the packet. When the sequential number "NSpack" has been inserted in the data packet in the block 7, the corresponding current or expected sequential number "NSexp" stored in the list 9 is incremented to its next following value, i.e. generally by 1 (naturally other number sequences can be used) and further in the data packet a particular flag "R", is set to a suitable value, which will be described in more detail hereinafter. The data packet modified in this way as indicated at 2" is transferred through a switching and distributing circuit 11 which is designated as "Scatter Logic" and is arranged to distribute and forward the packet to a server 5 which at the current instant has a low degree of utilization.

However, it may happen that the destination address of the data packet is not found in the list 9, and then the sequential number "NSpack" is inserted in or added to the data packet corresponding to a suitable start value "NSstart". Further, in this case, a new record is inserted in the list 9, this new record comprising an address of the output port, to which the data packet is to be transferred, and a current sequential number "NSexp", typically equal to "NSstart+1", is also inserted, which then indicates the sequential number which is to be given to the next data packet which will possibly arrive after this first data packet and has the same output address as the considered data packet. In this case also the flag "R" in the data packet is set to another value than in the case where the address of the output port, to which the data packet is to be transferred, was found in the list 9. If the list 9, which has a limited size, appears to be full, that record can be removed therefrom, which has a longest time period of inactivity, i.e. has the largest time difference between the current time and the time when a data packet having the destination indicated in the record latest arrived to the considered input/output port.

The situation that the list 9 is full will, with an appropriate dimensioning of the list 9, according to the introductory discussion, however, normally never occur since "too old" records are continuously removed from the list by a special procedure.

For removing records from the list 9 which have too long time periods of inactivity, which is equal to the fact that the sequential numbers in these records have not been incremented during a predetermined time period before the current time or worded in the same way as above those records which have a sufficiently large time difference between the current time and the time when a data packet with this destination address latest arrived to the considered input/output port or that during a predetermined time period no data packet with the same destination address as in these records has arrived, a time logic circuit 13 is provided. It checks continuously the list 9 and for this checking operation another field in each record in the list 9 is used indicating the latest time of activity in this record, i.e. when a packet latest arrived having the destination address indicated in the record. The time indication in the records of the list 9 may be entered by the sequence marking logic at the same time that a stored expected sequential number is incremented when processing an arrived packet.

The output logic illustrated in the input/output port 3 receives data packets transferred in the network and in particular the packets are received by a block 15 which performs a resequencing of the received data packets so that they will be forwarded from the network and the port in such a correct sequential order which is necessary and which can be achieved. Therefore the logic block 15 for the resequencing has access to a buffer memory 17 for storing data packets which have arrived too early and further a list 19 comprising the current source addresses for the data packets transferred to this input/output port and the corresponding current or expected, next sequential numbers "NRexp". A time logic circuit 21 removes records from this list which have been inactive for a sufficiently long time period in the same way as the time logic circuit 13 for processing the list 9 in an input port of the network, so that from the list 19 records are removed, for which the current sequential number "NRexp" has not been incremented during a sufficiently long time period, which is equal to the fact that no data packet has arrived to this input/output port from the source in the network indicated in the record. The resequencing logic 17 also strips information added to the packet in the sequence marking logic 7, see the packet indicated at 4", in particular the added sequential number "NSpack" and internal input and/or output addresses used for the transfer of the packet. From the resequencing logic 17 the packet is transferred to the output or egress logic as indicated in the block 3 to be forwarded from the processing network. Also therein, some address conversion may be performed, assisted by tables stored in a memory 3'.

In FIG. 2a the format of an incoming data packet is schematically illustrated in the shape of a sequence, not indicated in detail, of binary units. After the processing in the various parts of an input/output port, in particular the input or ingress logic 1 illustrated in FIG. 1, the data packet has been provided with an internal header 23 as illustrated in FIG. 2b used within the network, the header 23 comprising a field for a flag "R" and another field for the sequential number "NSpack" of the data packet. In this case it is assumed that the source and destination of the data packet are not explicitly indicated in the data packet at the start. In the input/output port 1 the data packet can further be provided with special addresses of a source and a destination used inside the network in various fields in the internal header 23.

As is illustrated in FIG. 3a, there may be in the data packet when it arrives to the processing network and before its transfer through the network, information relating to an exterior destination, i.e. an address of a receiver, which for instance is not incorporated in the network shown in FIG. 1.

Further, there may also be information relating the original transmitter of the data packet in the shape of an address of an outside or exterior source in a special field in the original data packet. By the input logic in the input/output port 1 a header 23 is added to the data packet, as illustrated in FIG. 3*b*, in the same way as has been described with reference to FIG. 2*b*.

For accomplishing a correct forwarding order of the different data packets at the forwarding thereof from the network it is necessary for the output logic that there is information in each packet indicating the place from where the packet arrives, i.e. a field indicating the source of the packet, which possibly can be the source of the packet inside the network, i.e. the address of the input/output port, to which the packet arrived to the network. This information can either be contained in an explicit field in the header inserted at the arrival to the network, as in FIG. 2*b*, or in some other manner being explicitly or implicitly indicated in other fields, for instance in the original data packet itself, as is the for case packet illustrated in FIG. 3*a*.

In the following the second case is treated, where it is assumed, as for instance according to FIG. 3*a*, that both a source address and a destination address can be derived from the packet itself. However, as indicated above this is not necessary, but for the processing in the output logic information is only required relating to the source of the data packet, which can be an address of a station outside the network or an indication of the input/output port, at which the data packet arrived to the processing network illustrated in FIG. 1.

In FIG. 4 the configuration of the list 9 is illustrated which is established by the input logic of the block 1 in FIG. 1. In the list 9 there is a number of records, and this number of records is, however, according to what has been said above, limited, in a practical case even to such a small number as for instance 16 records. Such a small number of records can rapidly be searched by the marking logic circuit 7, which among other things inserts the sequential number "NSpack" in the header 23 of each data packet. The list 9 thus comprises records having fields which indicate a source address and a destination address of a received data packet, for this combination of a source address and a destination address the next sequential number "NSexp" which is to be assigned to a new data packet, if such a packet will arrive to the input/output port and has the source address and destination address indicated in this record. Further, there is also in the list and in each record a field for a time indication indicating the time when a data packet latest arrived to the input/output port with the source address and destination address indicated in the record, i.e. the latest time when the field "NSexp" for the next, expected sequential number was changed. In this list the fields for source addresses are not quite necessary but can be omitted, the source addresses for each record then being thought of as being replaced by for instance the own address of the considered input/output port.

In FIG. 5 a corresponding list 19 is illustrated, which is made by the resequencing logic 15 of an input/output port. This list must contain a larger number of records than the lists used by the input logic in the input/output ports, as is illustrated by the introductory discussion. Each record here contains also fields containing a source address and a destination address, then a field for the next expected sequential number "NRexp", which the data packet is to have which will possibly arrive to this input/output port to be forwarded and has the combination of a source address and a destination address as indicated in the considered record. Further there is a field for a state indicator which indicates if there is one or more stored or buffered data packets which have the same source address and destination address as is indicated in the record. Such a stored packet must then have an own sequential number "NSpack" which is larger than the next expected sequential number "NRexp" for the combination of a destination address and a source address indicated in the record, since it otherwise would have been forwarded from the network. Further there is a field which can contain a pointer to or an address in a memory of the first stored data packet which has this source address and destination address. Further there is, like in FIG. 4, a field for a time indication, where a time value is inserted indicating the time of the last activity for data packets having this source address and destination address, i.e. the time when a data packet having the source address and destination address indicated as in this record the last time was received over the network to be forwarded from this input/output port. Here the field comprising the destination address can be omitted, in such a case to be logically replaced by the address of the considered input/output port in the network, which is a fixed address for all data packets, that arrive to this input/output port after transfer in the network.

Figure 6:
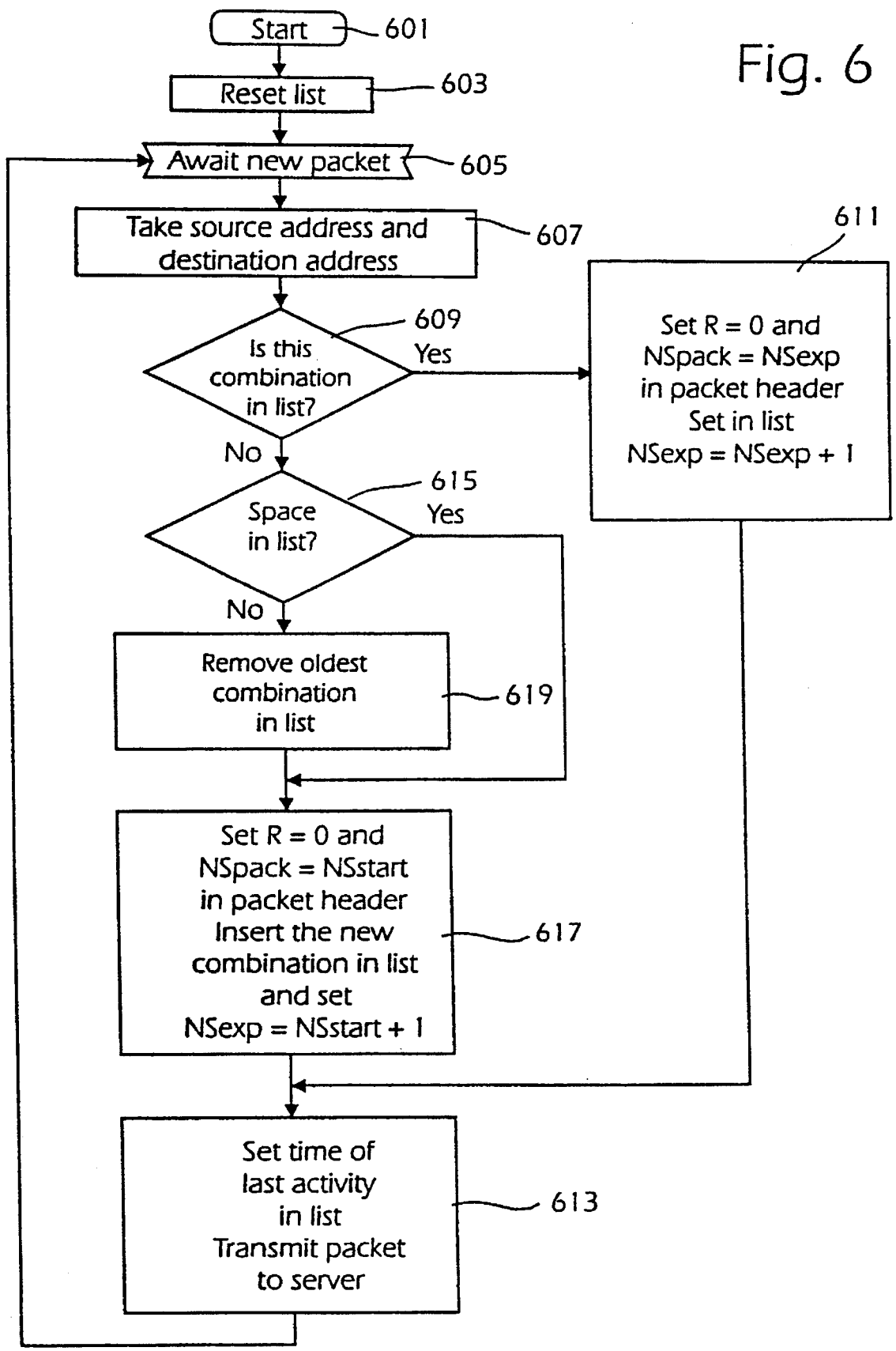
FIGS. 6 and 7 are flow diagrams of parallel procedures performed in an input port of the network.

In FIG. 6 a flow diagram is illustrated which is performed by the logic circuits at an arrival of a data packet to the network and in particular the logic block 7 for inserting a sequential number "NSpack" in a header 23 of a data packet. The procedure starts in a start block 601 and then in a block 603 a list is reset, i.e. all its records are removed or set equal to zero, the list being of the type indicated at 9 in FIG. 1 and illustrated in more detail in FIG. 4. Then in a block 605 it is awaited that a data packet will arrive to the input/output port from the outside. When such a data packet arrives, in the block 607 the source address and destination address of the data packet is determined, e.g. extracted from fields inside packet itself, and then in a block 609 the list 9 is searched to decide whether this combination of a source address and a destination address already is written in a record in the list 9. As has been observed above, the steps 607 and 609 can be replaced by the method that only the destination address in the network is determined and that it then is decided if precisely this destination address is found in a list configured in a corresponding manner.

If it is decided in the block 609, that the combination is in a record in the list, in a block 611 a restart flag "R" having a value 0 is inserted in the header 23 of the data packet, which header here, at the arrival of the data packet to the network, is inserted in or added to the data packet. Then a sequential number "NSpack" is inserted, which is set equal to the current or expected sequential number "NSexp", which is taken from the record found in the list 9. Further, in the block 611 the counter "NSexp" is stepped which indicates the current sequential number, to its next value, i.e. it is generally increased by 1. After that, in a block 613 a time indication value is inserted in the list 9, so that the current time is inserted in the corresponding field in considered record in the list. Then the data packet, controlled by the switch 11, see FIG. 1, can be transmitted to a suitable server 5, advantageously the server which at this instant has the lowest load. Then the input logic continues to the block 605 to await the arrival of a new data packet from the outside to the network.

If it was decided in the block 609, that the combination of a source address and a destination address of the data packet was not found in the list 9, it is checked in a block 615, whether there is space in the list 9 to insert another combination of a source address and a destination address therein.

If it is decided to be the case, in a block 617 the sequential number "NSpack" of the data packet in the header 23, with which the data packet is here provided, is set to the start value "NSstart" of the sequential numbering, i.e. generally equal to 0 and further the sequential numbering restart flag "R" is inserted with a value equal to 1, indicating the restart of the sequential numbers. The new combination of a source address and a destination address valid for this data packet is inserted in the list 9 and the current sequential number "NSexp" is in the list set to the value corresponding to the value which follows the start value "NSstart" for the sequential numbering, i.e. it is for instance set to 1. Then as above the block 613 is performed.

If it was decided in the block 615, that the whole list 9 is full, i.e. that there is no space for another combination of a source address and a destination address, in a block 619 the time indications are checked for the different records in the list 9 and then that record is removed, for which the time of activity is as early as possible, i.e. for the oldest, not updated record. After that, like above, the block 617 is performed.

Figure 7:
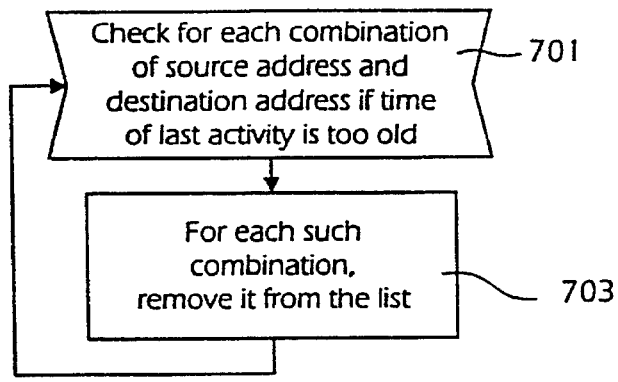

In parallel to the routine illustrated in FIG. 6 or possibly comprised therein a check is performed that the records in the list 9 will not be too old. This procedure is illustrated in FIG. 7, where in a block 701 for each combination of a source address and a destination address the corresponding time indication of last activity is checked. If the time difference of the current time and this time indication is too large, i.e. larger than some predetermined value, for a record it is removed in a block 703. Then the procedure returns to the block 701 to check again continuously the age of the records.

Figure 8:
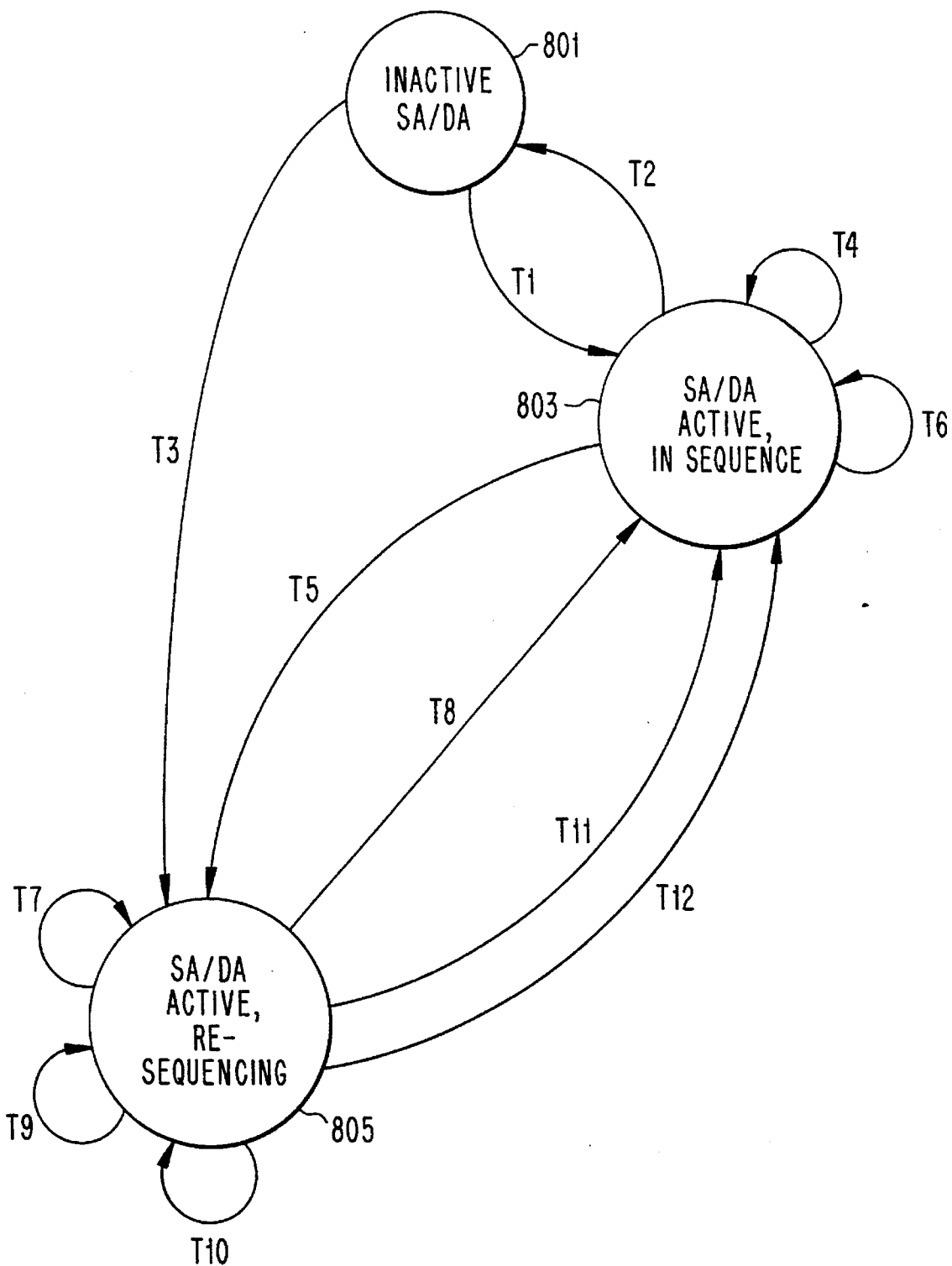
FIG. 8 is a picture of the procedure which is performed in the output port of the network illustrated as a state machine for a certain combination of source and address.

In FIG. 8 the main procedure of the output or egress logic is illustrated in the shape of a state machine and in particular in the block 15 in FIG. 1. Here there are three states which are valid for each data packet handled by the logic, that is both for stored or buffered packet and when a data packet is received by the input/output port to be forwarded from the network or buffered, the states being characterized by the conditions if a combination of a source and destination address is stored in the list 19 and if there a packets buffered for such a combination. The first state 801 is constituted by a combination of a source address and a destination address, SA/DA, which is not found in the list 19, this combination being designated as inactive. A second state 803 is that the combination of a source address and a destination address is present in the list 19, and that there are no stored data packets in the buffer 17, this state being designated as that the combination of a source address and a destination address, SA/DA, is active and that the packet arrives in sequence. This happens for instance in the case where all data packets up to now which have arrived with this combination of a source address and a destination address have arrived in the correct sequential order. Further there is a third state 805 indicating that for a combination of a source address and a destination address there are data packets stored in the buffer 17, which are waiting to be forwarded and for which a resequencing must be performed. This state is indicated as that the combination SA/DA is active and that a resequencing must be made.

The conditions for the state changes as illustrated in FIG. 8 are summarized below:

T1: transition from the first state 801 to the second state 803. If a received data packet has its flag "R" set to 1, the data packet is the first one in a new sequence of the sequential numbering and will be directly forwarded from the network and from the considered input/output port. Then the current sequential number "NRexp" in the list 19 for this combination of a source address and a destination address is set to the value which follows next to the sequential number "NSpack" of the received and forwarded data packet, i.e. generally corresponding to the expression "NSpack+1", which typically is equal to 1.

T2: transition from the second state 803 to the first state 801. The time indication for last activity in the list 19 for a record has been too old and this record characterized by its combination SA/DA is removed from the list 19.

T3: transition from the first state 801 to the third state 805. A receiued data packet has a combination of a source address and a destination address which is not present in the list 19 and further, the flag "R" is equal to zero. Then this combination of a source address and a destination address is inserted in the list 19 and the data packet is stored in the buffer 17.

T4: transition within the second state 803. A received data packet has its flag "R" set to zero and arrives in the correct sequential order. Then the data packet is forwarded directly from the network and the current sequential number "NRexp" for the combination SA/DA of the received packet is incremented by one step, generally by 1.

T5: transition from the second state 803 to the third state 805. The received data packet has its flag "R" set to zero but its sequential number "NSpack" comes after the current sequential number "NRexp" stored in the list 19 for the combination of a source address and a destination address of the packet. Then the data packet is stored in the buffer 17 and is also provided with a time indication which is equal to the current time.

T6: transition within the second state 803. A received data packet has a sequential number "NSpack" which is before the current sequential number "NRexp" in the list 19 which is stored for the combination of a source address and a destination address of this data packet. This data packet apparently arrived too late and is already skipped and can therefore be discarded.

T7: transition within the third state 805. Here a data packet is received with its flag "R" set to 0 and its sequential number "NSpack" equal to the current sequential number "NRexp" which is stored for the combination of a destination address and a source address of the data packet in the list 19. Then this data packet can be forwarded directly since it arrives in the correct sequential order. Further the first data packet stored in the buffer 17 can be treated as a new arrived data packet for a check of its sequential order and the possible forwarding thereof from the network.

T8: transition from the third state 805 to the second state 803. A received data packet has its flag "R" set to 0 and its sequential number "NSpack" equal to the current sequential number "NRexp" which is stored for the combination of a source address and a destination address of the data packet in the list 19. Further, the data packet stored in the buffer 17 for this combination of a source address and a destination address has a sequential number equal to value following directly after the current sequential number "NRexp". Then both these data packets can be forwarded whereby there is no longer any data packet stored in the buffer 17 for this combination of a source address and a destination address. The corresponding indicator in the list 19, see FIG. 5, can then be changed, for instance reset. Further, the current sequential number "NRexp" is incremented by two steps, i.e. generally by 2.

T9: transition within the third state 805. A received data packet has its flag "R" set to 0 and further its sequential number "NSpack" larger than the current sequential number "NRexp" which is stored in the list for the combination of a source address and a destination address of the data packet. This data packet has not the correct sequential order and is therefore stored in the buffer 17. If data packets already are stored in the buffer, the new data packet is stored in the correct sequential order in relation to the already stored packet or packets. Further, together with the packet a time indication is stored indicating the current time.

T10: transition within the third state 805. A received data packet has its flag "R" set to 1 and further there are more data packets stored in the buffer 17 for the combination of a source address and a destination address of the arrived data packet. The value of the flag indicates a restart of the sequential numbering and therefore the data packet can be directly forwarded from the network and the packets stored in the buffer can be discarded and the state indicator, see FIG. 5, set to a value indicating that no packets are stored.

T11: transition from the third state 805 to the second state 803. A single data packet is stored in the buffer 17 for a certain combination of a source address and a destination address. Further, the time period has elapsed for this data packet, i.e. the time difference between the present time and the time indication which is stored in the buffer 17 together with the data packet is too large, i.e. exceeds a predetermined value. Then this data packet is forwarded and further the current sequential number "NRexp" for this combination of a source address and a destination address is set to a value which follows next after the sequential number "NSpack" of the just forwarded data packet, i.e. generally equal to "NSpack+1". Then there is not any longer a data packet stored in the buffer 17 for this combination of a source address and a destination address.

T12: transition from the third state 805 to the second state 803. Several data packets are stored in the buffer 17 for a certain combination of a source address and a destination address. Further the first stored data packet is too old, i.e. the time difference of the present time and the time which is stored in the buffer together with the data packet exceeds a predetermined value. Then this oldest data packet is forwarded and the current sequential number "NRexp" for this combination of a source address and a destination address in the list 19 is set to the value following next after the sequential number "NSpack" of the forwarded data packet, i.e. generally equal to "NSpack+1". After that the next data packet in the buffer 17 for this combination of a source address and a destination address is processed as a new received data packet.

Figure 10:
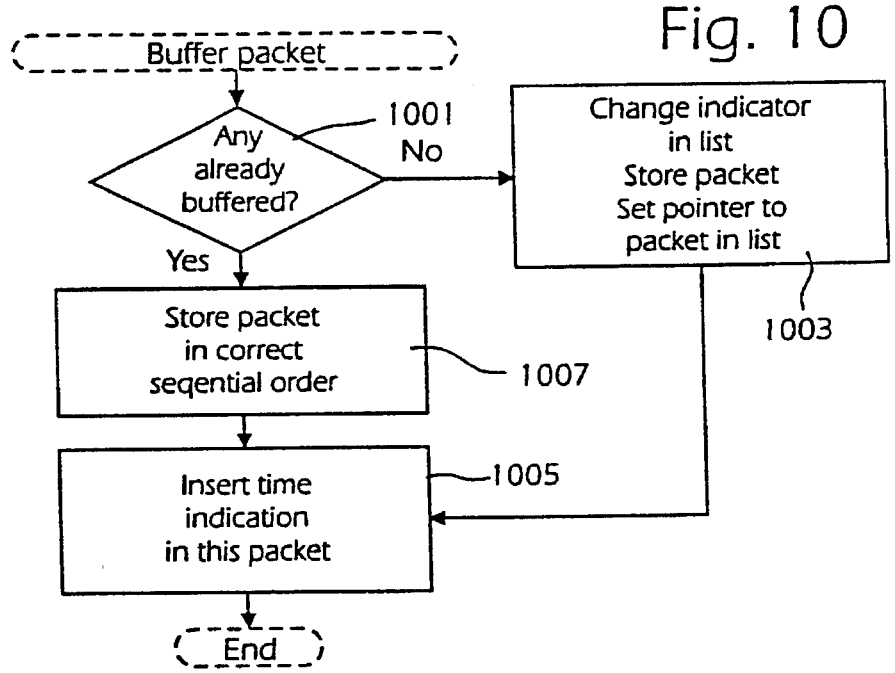
FIGS. 9–12 are flow diagrams of different parallel procedures which are performed in an output port of the network.
Figure 12:
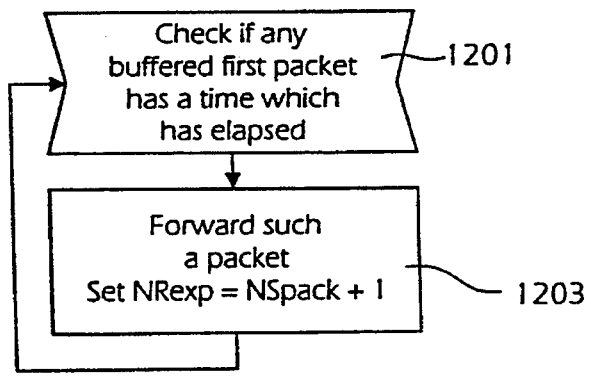
Figure 9:
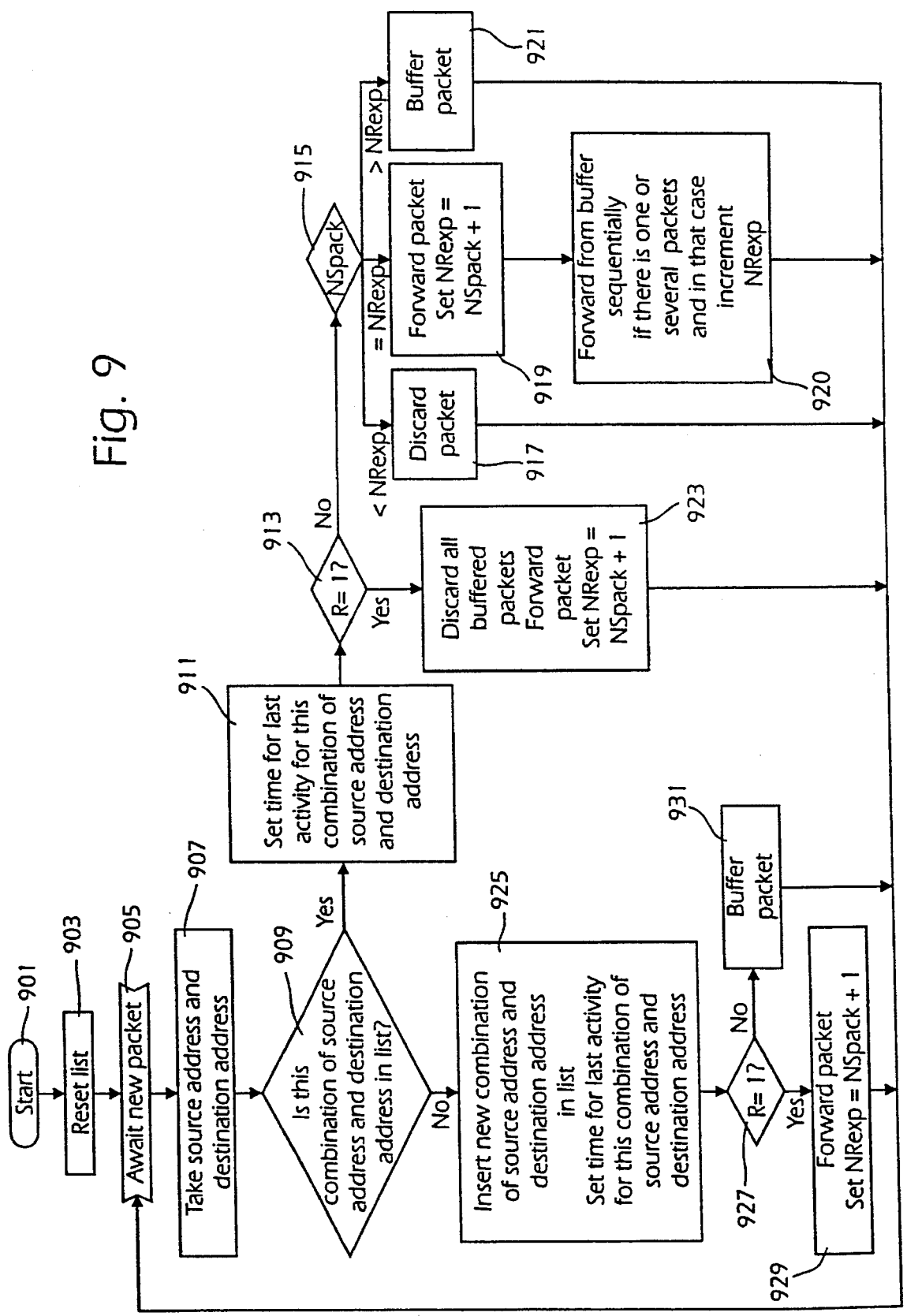
Figure 11:
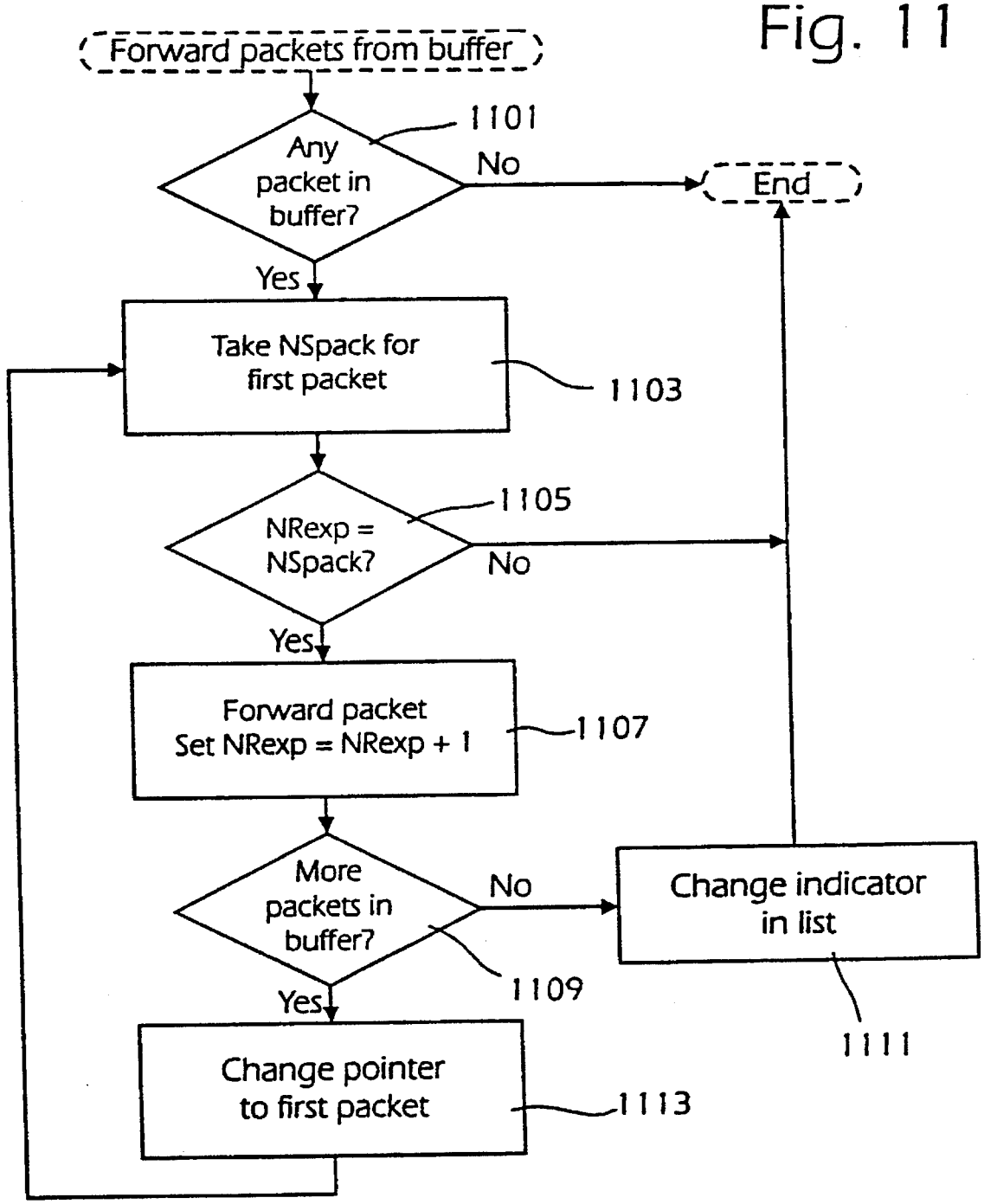

The state machine shown in FIG. 8 is also illustrated in FIGS. 9–12 in the corresponding flow diagrams. Here FIG. 9 shows a first procedure and FIGS. 10 and 11 illustrate in more detail two subprocedures thereof. FIG. 12 and FIG. 7 illustrate procedures which are performed in parallel to the procedure of FIG. 9, possibly incorporated in this procedure.

In FIG. 9 thus the main procedure is illustrated as performed in the output logic in an input/output port 3 in the shape of a flow diagram which starts in a start block 901. After that the list 19 is reset in a block 903, that is all the records therein are erased. Then in a block 905 the reception is awaited of a new data packet transferred through the network. When such a data packet arrives, in some way a source address and a destination address are determined for the received data packet. Then it is checked in a block 909, if this combination of a source address and a destination address is already stored in the list 19. The blocks 907 and 909 can in the simplest case be replaced by the procedure that only a source address in the network of a received data packet is determined and that the list 19 only comprises different active source addresses which are then searched for equality to the source address of the received packet. If it is decided in the block 909 that this combination of a source address and a destination address is stored in the list, in the record in the list 19 comprising this combination of a source address and a destination address information is inserted relating to the present time in the field of last activity.

Then it is determined in a block 913 whether the received data packet has its flag "R" set equal to 1. If it is decided not to be the case, i.e. that no restart of the sequential numbers is valid for this data packet or that this packet has a sequential number which is the first one in a new sequence, it is tested in a block 915 whether the received data packet arrives in a correct sequential order. Thus the sequential number "NSpack" of the data packet is tested and if this number is smaller than the current sequential number "NRexp" which is stored in the list 19 for this combination of a source address and a destination address, the data packet in some way arrives too late and can therefore be discarded in a block 917. Then the procedure continues to the block 905 to await the reception of a new data packet transferred through the network.

If it is instead decided in the block 915 that the sequential number "NSpack" of the data packet agrees with the current sequential number "NRexp" for this combination of a source address and a destination address, the data packet arrives in a correct sequential order and can therefore be forwarded in a block 919. Then the current sequential number "NRexp" is increased to its next following value, i.e. it is generally set equal to "NRexp+1" or "NSpack+1". Further, in a block 920 a routine is performed for forwarding from the buffer 17, if there are stored data packets therein, which come sequentially after the forwarded data packet. This routine is illustrated in more detail in the flow diagram in FIG. 11. Then the procedure continues to the block 905 to await the reception of a new data packet transferred through the network.

If it in the block 915 finally is decided that the sequential number "NSpack" of the received data packet is larger than the current sequential number "NRexp" which is stored for the combination of a source address and a destination address of the data packet, the data packet is stored in the buffer 17, which is shown in a block 921. The corresponding routine is illustrated in more detail in the flow diagram in FIG. 10. Then the procedure continues to the block 905 to await the arrival of a new data packet transferred through the network.

If it is decided instead in the block 913, that the received data packet has its flag "R" set to 1, i.e. that a restart of the sequence numbering is to be performed, some error has appeared and then in a block 923 all data packets stored in the buffer 17 are discarded having this combination of a source address and a destination address. Then the received data packet is forwarded and the current sequential number "NRexp" is set equal to the sequential number which corresponds to the sequential number which comes next after the sequential number "NSpack" of the received data packet. After that the procedure again continues to the block 905 to await arrival and the reception of a new data packet.

If it was decided in the block 909, that the combination of a source address and a destination address in a received data packet is not already stored in the list 19, in a block 925 this new combination of a source address and a destination address is inserted in the list 19. In the list 19 the current time is stored in the field of last activity for this combination of a source address and a destination address. Then it is tested in a block 927, whether the flag "R" is equal to 1 for the received data packet. If it is true, in a block 929 the data packet can be forwarded and the current sequential number "NRexp" for this combination of a source address and a destination address in the list 19 is set to a value which follows next after the sequential number "NSpack" of the received data packet, i.e. generally "NSpack+1". Then the procedure continues to awaiting, in the block 905, the reception of a new data packet.

If it was decided instead in the block 927 that the flag "R" of the received data packet was not set to 1, this packet must belong to a new sequence of sequential numbers, for which the first data packet has not yet been received. Then in a block 931 the received data packet is stored in a buffer 17, the corresponding indicator and pointer being set in the list 19. Then the procedure continues again to awaiting the reception of a new data packet in the block 905.

In FIG. 10 a flow diagram is illustrated for the procedure which is performed in the block 929 in the flow diagram in FIG. 9. Here in a block 1001 it is tested whether any data packet has already been stored in the buffer for the combination of a source address and a destination address as given by the received data packet. If it is decided not to be the case, in a block 1003 the indicator in the list 19 indicating that at least one data packet is stored in the buffer is changed, the data packet is stored in the buffer 17 and a pointer is inserted in the list 19 comprising an address of this data packet. Further, in a block 1005 a time indication is inserted of the present time associated with the stored data packet. Then the procedure is terminated. If it was decided in the block 1001, that data packets are already stored in the buffer for this combination of a destination address and a source address, in a block 1007 the data. packet is stored in a correct sequential order in relation to the already stored data packets in the buffer 17. Then the procedure continues as above to the block 1005 for an insertion of a time indication for the just stored data packet.

In FIG. 11 a flow diagram is illustrated which shows in more detail the procedure of the block 920 in the flow diagram of FIG. 9. Thus it is checked here in a block 1101 whether any data packet having the considered combination of a source address and a destination address is already stored in the buffer. It is made by a check of the corresponding state indicator in the list 19 and if any data packet is not stored, the procedure can evidently be terminated. If instead a data packet is stored in the buffer, in a block 1103 the sequential number "NSpack" is taken for the first stored data packet in the buffer 17. Then it is checked in a block 1105, whether the sequential number "NSpack" of this data packet agrees with the current sequential number "NRexp". If there is no agreement, the procedure is terminated. If instead there is agreement, the data packet can be directly forwarded in a block 1107 and then also the current sequential number "NRexp" is increased by one step, i.e. generally by 1. After that it is decided in a block 1109, if more data packets are stored in the buffer 17 for this combination of a source address and a destination address. If no more data packets are stored, in a block 1111 the corresponding indicator in the list 19 is changed to indicate that there are no buffered data packets for this combination of a source address and a destination address. Then the procedure is again terminated. If it was decided instead in the block 1109, that more data packets are stored for this combination of a source address and a destination address in the buffer 17, in a block 1113 the pointer in the list 19 is changed, so that the pointer will point to the next following data packet having the same combination of a source address and a destination address. Then the procedure continues to the block 1103 and 1105 for a comparison of the sequential number "NSpack" for the first data packet in the list to the current sequential number "NRexp".

In parallel to the procedure illustrated in FIG. 9 a procedure is performed for monitoring that no record in the list 19 is too old. This procedure is the same one as that which is valid for the list 9 in the input logic and illustrated in FIG. 7 and has been described above. The predetermined time period used is however another. In parallel, also a procedure runs for a check that no data packet stored in the buffer 17 will be too old. The corresponding routine is illustrated by the flow diagram of FIG. 12, where it is checked in the block 1201 if there for some combination of a source address and a destination address a first data packet is stored in the buffer 17 which has a time indication which has become too old, i.e. if the time difference of the present time and the time indication of the data packet is larger than a predetermined value. If it is the case for a data packet, this data packet is forwarded in a block 1203 and further, the current sequential number "NRexp" for the combination of a source address and a destination address of this data packet is changed and set equal to the value following next after the sequential number "NSpack" of the forwarded data packet, that is generally its sequential number "NSpack" increased by 1.

What is claimed is:

1. A method of transferring data packets from input ports to output ports in a network, in which data packet transfers can require time periods of varying lengths and there is a first category comprising all input ports and a second category comprising all output ports comprising the steps of:

when a data packet arrives at an input port, inserting a sequential number into the arrived data packet, the sequential number indicating a sequential position of the arrived data packet;

feeding data packets in a correct sequential order from an output port based on the sequential number of each arrived data packet that has been transferred to the output port;

in at least one of the categories of ports, establishing a list comprising records, wherein each record comprises an address associated with a respective arrived data packet and a current sequential number associated with a next data packet that has the same address and is next to arrive at the input port or is to be transferred to the output port, respectively; the records comprise different addresses and only addresses associated with data packets that have latest arrived at the input port or have been latest transferred to the output port, respectively; and performing at least one of the following steps:

where a time period for transferring a data packet through the network from an input port to an output port is always smaller than a predetermined time period, restricting a list in an output port to a limited number of records, the limited number of records being larger than a smallest number that allows, considering the predetermined time period, a resequencing of data packets transferred to the output port;

removing a record from the list in the output port when no data packet associated with the address of the record has arrived at an input port during the predetermined time period.

2. The method of claim 1, wherein a list in an input port contains records comprising a destination address, the destination address being included in the data packets themselves or an address of an output port in the network to which the data packets are to be transferred, and a list in an output port contains records comprising a source address, the source address being included in the data packets themselves or an address of an input port in the network from which the data packets have been transferred.

3. The method of claim 2, wherein if the step of removing a record is performed, the number of records in a list in an output port is equal to or larger than a ratio of a sum of a maximum time period for transferring a data packet in the network from an input port to an output port and a time period after which a record in an input port is removed and a minimum time period during which an output port can receive data packets transferred through the network.

4. The method of claim 2, wherein the predetermined time period is equal to or larger than a sum of a maximum time period for transferring a data packet in the network from an input port to an output port and a time period after which a record in an input port is removed.

5. The method of claim 2, wherein in each record in a list in an input port of the network, information is inserted that represents a time when a data packet latest arrived at the input port associated with the address indicated in the respective record.

6. The method of claim 2, wherein when a data packet has been transferred in the network to an output port and the dam packet has a sequential number following a current sequential number in the list's record comprising the address with which the data packet is associated, the data packet is stored to be fed later from the output port.

7. The method of claim 6, wherein at substantially the same time as a data packet having a sequential number following the current sequential number is transferred, information is stored relating to a time when the data packet that was received in the output port is stored.

8. The method of claim 6, wherein when a data packet has been stored for at least the predetermined time period, the data packet is fed from the output port.

9. The method of claim 8, wherein when a stored data packet is fed from an output port, the current sequential number in the list's record comprising the address with which this data packet is associated is set equal to a sequential number that is next after the sequential number of the stored data packet.

10. A method of transferring data packets from input ports to output ports in a network, in which data packet transfers can require time periods of varying lengths and there is a first category comprising all input ports and a second category comprising all output ports comprising the steps of:

when a data packet arrives at an input port, inserting a sequential number into the arrived data packet, the sequential number indicating a sequential position of the arrived data packet;

feeding data packets in a correct sequential order from an output port based on the sequential number of each arrived data packet that has been transferred to the output port;

in at least one of the categories of ports, establishing a list comprising records, wherein each record comprises an address associated with a respective arrived data packet and a current sequential number associated with a next data packet that has the same address and is next to arrive at the input port or is to be transferred to the output port, respectively; the records comprise different addresses and only addresses associated with data packets that have latest arrived at the input port or have been latest transferred to the output port, respectively; and performing at least one of the following steps:

where a time period between data packets transferred from an input port into the network is always larger than a predetermined time interval, restricting a list in an input port to a limited number of records, the limited number of records being larger than a smallest number that prevents a data packet that arrives at the input port and is not associated with a record in the list in the input port from being transferred to an output port in the network before a previous data packet that is transferred to a same output port and is associated with a same address has been transferred through the network to the output port;

removing a record from the list in an input port when no dam packet associated with the address of the record has arrived at the input port during a predetermined time period.

11. The method of claim 10, wherein a list in an input port contains records comprising a destination address, the destination address being included in the data packets themselves or an address of an output port in the network to which the data packets are to be transferred, and a list in an output port contains records comprising a source address, the source address being included in the data packets themselves or an address of an input port in the network from which the data packets have been transferred.

12. The method of claim 11, wherein if the step of removing a record is performed, the number of records in a list in an input port is equal to or larger than a ratio of a time period after which a record in an input port is removed and a minimum time period at which an input port can issue data packets to be transferred through the network or a ratio of a maximum time period for transferring a data packet in the network from an input port to an output port and a minimum time period.

13. The method of claim 11, wherein the predetermined time period is equal to or larger than a maximum time period for transferring a data packet in the network from an input port to an output port.

14. The method of claim 11, wherein in each record in a list in an input port of the network, information is inserted that represents a time when a data packet latest arrived at the input port associated with the address indicated in the respective record.

15. The method of claim 11, wherein when a data packet has been transferred in the network to an output port and the data packet has a sequential number following a current sequential number in the list's record comprising the address with which the data packet is associated, the dam packet is stored to be fed later from the output port.

16. The method of claim 15, wherein at substantially the same time as a data packet having a sequential number following the current sequential number is transferred, information is stored relating to a time when the data packet that was received in the output port is stored.

17. The method of claim 15, wherein when a data packet has been stored for at least the predetermined time period, the data packet is fed from the output port.

18. The method of claim 17, wherein when a stored data packet is fed from an output port, the current sequential number in the list's record comprising the address with which this data packet is associated is set equal to the sequential number that is next after the sequential number of the stored data packet.

19. A network for transferring data packets from input ports to output ports of the network, in which data packet transfers require time periods of different lengths and there is a first category comprising all input ports and a second category comprising all output ports comprising:

means for inserting, into a data packet arrived at an input port, a sequential number indicating a sequential position of the arrived dam packet;

in an output port, means for forwarding arrived data packets that have been transferred to the output port, the transferred data packets being forwarded in a correct sequential order based on the sequential numbers of the transferred data packets;

in at least one of the categories of ports, means for establishing a list comprising records, wherein each record comprises an address associated with a respective arrived data packet and a current sequential number associated with a next data packet associated with the same address that is next to arrive at the input port or is to be transferred to the output port, respectively; and the records comprise different addresses and only addresses associated with data packets that have latest arrived at the input port or have been latest transferred to the output port, respectively;

a memory, in communication with the establishing means, for storing each list; and further comprising at least one of:

means for restricting a list in an output port to a limited number of records, the number of records being larger than a smallest number that allows a resequencing of data packets transferred to the output port;

arranging means in the establishing means for monitoring each record in the list in an output port to remove from the list a record when no data packet associated with the address of the record has arrived at the input port during the predetermined time period.

20. The network of claim 19, wherein the establishing means makes the records in an input port comprise a destination address, the destination address being an address in the data packets themselves or an address of an output port in the network to which the data packets are to be transferred, and the establishing means makes the records in an output port comprise a source address, the source address being an address in the data packets themselves or an address of an input port in the network from which the data packets have been transferred.

21. The network of claim 20, wherein if the arranging means is included in the network, the number of records in a list in an output port is equal to or larger than a ratio of a sum of a maximum time period for transferring a data packet in the network from an input port to an output port and a time period after which a record in an input port is removed and a minimum time period during which an output port can receive data packets transferred through the network.

22. The network of claim 20, wherein the arranging means uses as a value of the predetermined time period a value equal to or larger than a sum of a maximum time period for transferring a dam packet in the network from an input port to an output port and a time period after which a record in an input port is removed.

23. The network of claim 20, wherein for each record in the list in the input port stored in the memory means, the establishing means inserts information relating to a time when a data packet latest arrived to the input port associated with the address in the respective record.

24. A network for transferring data packets from input ports to output ports of the network, in which data packet transfers require time periods of different lengths and there is a first category comprising all input ports and a second category comprising all output ports comprising:

means for inserting, into a data packet arrived at an input port, a sequential number indicating a sequential position of the arrived data packet;

in an output port, means for forwarding arrived data packets that have been transferred to the output port, the transferred data packets being forwarded in a correct sequential order based on the sequential numbers of the transferred data packets;

in at least one of the categories of ports, means for establishing a list comprising records, wherein each record comprises an address associated with a respective arrived data packet and a current sequential number associated with a next data packet associated with the same address that is next to arrive at the input port or is to be transferred to the output port, respectively; and the records comprise different addresses and only addresses associated with data packets that have latest arrived at the input port or that have been latest transferred to the output port, respectively;

a memory in communication with the establishing means, for storing each list; and further comprising at least one of:

means for restricting a list in an input port to a limited number of records, the number of records being larger than a smallest number that prevents a data packet that arrives at the input port and is not associated with a record in the list in the input port from being transferred to an output port in the network before a previous data packet, which is transferred to a same output port and with which a same address is associated, has been transferred through the network to the output port, wherein a time period between data packets transferred from an input port into the network is always larger than a predetermined time interval;

arranging means in the establishing means for monitoring each record in the list in an input port to remove records from a list when no data packet associated with the address of the record has arrived at the input port during a predetermined time period.

25. The network of claim 24, wherein the establishing means makes the records in an input port comprise a destination address, the destination address being an address comprised in the data packets themselves or an address of an output port in the network to which the data packets are to be transferred, and the establishing means makes the records in an output port comprise a source address, the source address being an address in the data packets themselves or an address of an input port in the network from which the data packets have been transferred.

26. The network of claim 25, wherein if the arranging means is included in the network, the number of records in a list in an input port is equal to or larger than a ratio of a time period after which a record in an input port is removed and a minimum time period at which an input port can issue data packets to be transferred through the network or a ratio of a maximum time period for transferring a data packet in the network from an input port to an output port and a minimum time period.

27. The network of claim 25, wherein the arranging means uses as a value of the predetermined time period a value equal to or larger than a maximum time period for transferring a data packet in the network from an input port to an output port.

28. The network of claim 25, wherein for each record in the list in the input port stored in the memory means, the establishing means inserts information relating to a time when a data packet latest arrived to the input port associated with the address in the respective record.

* * * * *